United States Patent [19]

Omi

[11] Patent Number: 5,162,054

[45] Date of Patent: * Nov. 10, 1992

[54] PROCESS FOR PRODUCING MULTI-COMPONENT GLASS DOPED WITH MICROPARTICLES

[75] Inventor: Shigeaki Omi, Kawagoe, Japan

[73] Assignee: Hoya Corporation, Tokyo, Japan

[ * ] Notice: The portion of the term of this patent subsequent to Mar. 29, 2009 has been disclaimed.

[21] Appl. No.: 814,608

[22] Filed: Dec. 30, 1991

Related U.S. Application Data

[62] Division of Ser. No. 574,754, Aug. 30, 1990, Pat. No. 5,098,460.

[30] Foreign Application Priority Data

Sep. 7, 1989 [JP] Japan .................. 1-231859

[51] Int. Cl.$^5$ .............................................. C03C 10/00
[52] U.S. Cl. .................. 65/33; 65/DIG. 15; 423/509; 501/32; 501/40
[58] Field of Search .................. 501/32, 40; 65/18.3, 65/17, DIG. 15, 33, 32.1, 32.3; 423/508, 509, 561.1

[56] References Cited

U.S. PATENT DOCUMENTS

| | | | |
|---|---|---|---|
| 3,382,047 | 5/1968 | Holtzberg et al. | 65/DIG. 15 |
| 3,428,475 | 2/1969 | Teeg | 65/33 |
| 3,451,794 | 6/1969 | Patterson | 65/32 |
| 3,498,930 | 3/1970 | Sanefield | 65/33 |
| 3,627,573 | 12/1971 | Schottmiller | 501/40 |
| 3,773,530 | 11/1973 | Morgan | 501/30 |
| 3,834,883 | 9/1974 | Klein | 65/33 |
| 3,901,996 | 8/1975 | Hasegawa et al. | 65/DIG. 15 |
| 4,308,171 | 12/1981 | Dines et al. | 65/DIG. 15 |

FOREIGN PATENT DOCUMENTS

| | | |
|---|---|---|
| 2233868 | 4/1984 | Fed. Rep. of Germany . |
| 57-94943 | 6/1982 | Japan . |
| 62-222441 | 9/1987 | Japan . |

*Primary Examiner*—Kenneth M. Schor
*Assistant Examiner*—John J. Bruckner
*Attorney, Agent, or Firm*—Nixon & Vanderhye

[57] ABSTRACT

The method involves producing a multi-component glass doped with $CdS_x Se_y Te_z$ microparticles. The process has solved the conventional problems that the chalcogen element(s) to constitute the microparticles is (are) vaporized at the step for obtaining a glass melt, by specifying (a) the material to become a glass matrix and (b) the atmosphere used for obtaining a glass melt. The method involves using a mixture of elemental Cd and at least one of the elements S, Se and Te.

7 Claims, 2 Drawing Sheets

PROCESS FOR PRODUCING MULTI-COMPONENT GLASS DOPED WITH MICROPARTICLES

This is a division of application Ser. No. 07/574,754, filed Aug. 30, 1990 now U.S. Pat. No. 5,098,460.

BACKGROUND OF THE INVENTION (1) Field of the Invention

The present invention relates to a multi-component glass doped with microparticles, used as a material for sharp cut filter, a material for infrared-transmitting filter, a nonlinear optical material, etc., as well as to a process for producing said glass. More particularly, the present invention relates to a multi-component glass doped with microparticles comprising crystallites of $CdS_x Se_y Te_z$ ($0 \leq x \leq 1$, $0 \leq y \leq 1$, $0 \leq z \leq 1$, $x+y+z=1$), as well as to a process for producing said glass.

(2) Description of the Prior Art

Glasses doped with microparticles of CdS, CdSe, CdTe, $CdS_x Se_{1-x}$ solid solution ($0 < x < 1$), $CdS_x Se_{1-(x+y)} Te_y$ solid solution ($0 < x < 1$, $0 < y < 1$, $0 < x+y < 1$) or the like are in use as a material for sharp cut filter having an absorption end at the wavelength range of visible light or at an infrared range, or as a material for infrared-transmittingfilter. In recent years, glasses doped with microparticles of $CdS_x Se_{1-x}$ have been found to show third-order nonlinear properties [J. Opt. Soc. Am. Vol. 73, No. 5, pp. 647–653 (1983)] and are drawing attention as a nonlinear optical material for optical switch, optical computer, etc.

Such glasses doped with microparticles are, in general, multi-component glasses produced by a melting process comprising (a) heat-melting a mixture consisting of a starting material to become a matrix of a desired glass and a starting material to become microparticles dispersed in the matrix, to obtain a glass melt, (b) cooling the glass melt to room temperature to obtain a glass comprising a matrix and elements which are to constitute microparticles dispersed in the matrix and which are dissolved as ions in the matrix, and (c) heating the glass from room temperature to a given temperature and heat-treating the glass at the same given temperature to precipitate microparticles in the matrix.

When a glass doped with microparticles is produced by the above conventional melting process, however, there occurs, in the step of heat-treating raw materials to obtain a glass comprising a matrix and elements which are to constitute microparticles dispersed in the matrix, vaporization of said elements to be dissolved as ions in the matrix, particularly chalcogen elements such as S, Se, Te and the like (the chalcogen elements do not include oxygen in this specification). The concentration of chalcogen element ions in glass cannot be increased even by using, in the material mixture, an increased amount of the material to become microparticles. Therefore, the concentration of the microparticles precipitated in the matrix by heat treatment is usually less than 3% by weight.

As a result, a thin sharp cut filter or an infrared-transmitting filter produced from a multi-component glass doped with microparticles obtained by the convention melting process, has tended to show mild (not sharp) rise in the light absorption curve, and it has been difficult to obtain a sharp cut filter or an infrared-transmitting filter both having good spectral characteristics and yet being lightweight. Further, since the third-order optical susceptibility ($\chi^{(3)}$) which is a yardstick for the degree of third-order nonlinearity, is proportional to the concentration of microparticles, it has been difficult to obtain a multi-component glass doped with microparticles, having excellent third-order nonlinearity by the conventional melting process.

SUMMARY OF THE INVENTION

The present invention has been made in order to solve the above-mentioned tasks of the conventional multi-component glass doped with microparticles, when used as a filter material or as a nonlinear optical material. The first object of the present invention is to provide a multi-component glass doped with microparticles, in which glass the concentration of the microparticles is high. The second object of the present invention is to provide a process for producing a multi-component glass doped with microparticles, in which glass the concentration of the microparticles is high, by suppressing the vaporization of a component to become microparticles at the step for obtaining a glass melt.

The first object of the present invention has been achieved by a multi-component glass doped with microparticles, obtained by melting a mixture comprising a material to become a matrix of a multi-component glass and a material to become microparticles precipitated in the matrix, to obtain a glass melt and treating the glass melt to precipitate microparticles in a matrix of a multi-component glass, in which multi-component glass the microparticles consist of microcrystallites of $CdS_x Se_y Te_z$ ($0 \leq x \leq 1$, $0 \leq y \leq 1$, $0 \leq z \leq 1$, $x+y+z=1$) and the concentration of the microparticles is 5–50% by weight.

The second object of the present invention has been achieved by a process for producing a multi-component glass doped with microparticles, comprising:

heating a mixture of (a) a material to become a matrix of a multi-component glass, consisting of at least one compound selected from the group consisting of oxides usable as raw materials for ordinary glasses, carbonates each to become an oxide by thermal decomposition at absolute temperatures not higher than 0.5 time the melting point (expressed in absolute temperature) of the microparticles to be precipitated in the matrix, hydroxides each to become an oxide by thermal decomposition at absolute temperatures not higher than 0.5 time the melting point (expressed in absolute temperature) of the microparticles to be precipitated in the matrix, and a glass and (b) a material to become microparticles precipitated in the matrix, i.e. a substance comprising the elements to constitute the microparticles, in a mixed gas atmosphere consisting of an inert gas and a vapor of a substance comprising at least one of the same chalcogen elemtns as constituting the microparticles to be precipitated in the matrix, to obtain a glass melt having an absolute temperature of 0.8–1.2 times the melting point (expressed in absolute temperature) of the microparticles to be precipitated in the matrix, then heat-treating the glass melt at a given temperature, or cooling the glass melt and then heat-treating the resulting glass at a given temperature, to precipitate, in a glass matrix, microcrystallites of $CdS_x Se_y Te_z$ ($0 \leq x \leq 1$, $0 \leq y \leq 1$, $0 \leq z \leq 1$, $x+y+z=1$) in an amount of 5–50% by weight.

DETAILED DESCRIPTION OF THE INVENTION

Figure 1:
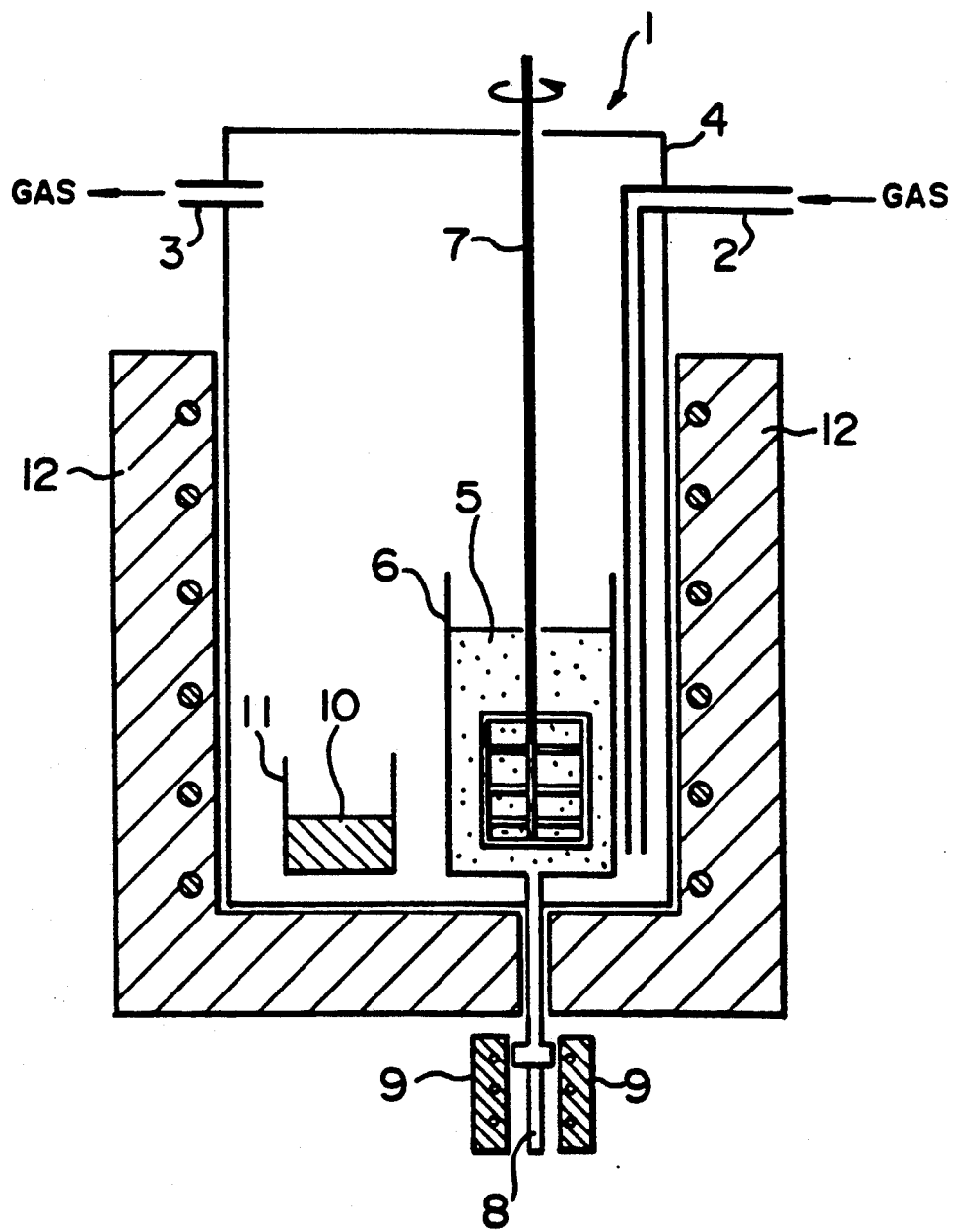
FIG. 1 is a drawing schematically showing the atmosphere controlled melting equipment used in the present process for producing a multi-component glass doped with microparticles.

The present invention is described in detail.

First, description is made on the multi-component glass doped with microparticles according to the present invention. The multi-component glass doped with microparticles according to the present invention is obtained by melting a mixture comprising a material to become a matrix of a multi-component glass and a material to become microparticles precipitated in the matrix, to obtain a glass melt and treating the glass melt to precipitate microparticles in a matrix of a multi-component glass; and in the present glass, the microparticle consist of microparticles of $CdS_x Se_y Te_z$ ($0 \leq x \leq 1$, $0 \leq y \leq$, $0 \leq z \leq 1$, $x+y+z=1$) and the concentration of the microparticles is 5-50% by weight.

When the concentration of $CdS_x Se_y Te_z$ microparticles is less than 5% by weight, the multi-component glass gives neither sharp rise in the light absorption curve when made into a thin filter, nor high third-order optical susceptibility ($\chi^{(3)}$), and accordingly is not suitable for practical application. When the concentration of said microparticles is more than 50% by weight, the proportion of glass matrix is lowered, resulting in reduced strength and durability of glass; and the precipitated microparticles bond to each other, incurring increase in apparent diameters of microparticles and resultant increase in light scattering; thus, such a multi-component glass is not suitable for practical application. Hence, the concentration of microparticles is specified to be 5-50% by weight in the multi-component glass doped with microparticles according to the present invention.

The multi-component glass doped with microparticles according to the present invention can be obtained by the present process for producing a multi-component glass doped with micropaticles, which is explained below.

In the present process for producing a multi-component doped with microparticles, there is used, as a material to become a matrix of a multi-component glass, at least one compound selected from the group consisting of oxides (e.g. $SiO_2$, $B_2O_3$, ZnO) usable as raw materials for ordinary glasses, carbonates (e.g. $CdCO_3$, $ZnCO_3$, $PbCO_3$) each to become an oxide by thermal decomposition at absolute temperatures not higher than 0.5 time the melting point (expressed in absolute temperature) of the microparticles to be precipitated in the matrix, hydroxides [e.g. $H_3BO_3$ corresponding to $B(OH)_3$, $Zn(OH)_2$, $Mg(OH)_2$, $Cd(OH)_2$ $Al(OH)_3$] each to become an oxide by thermal decomposition at absolute temperatures not higher than 0.5 time the melting point (expressed in absolute temperature) of the microparticles to be precipitated in the matrix, and a glass. For example, when only oxides are selected from the above group, there are used at least two oxides (e.g. a combination of $SiO_2$, $B_2O_3$ and ZnO). When oxides and carbonates are selected from the above group, there are used at least one oxide and at least one carbonate (e.g. a combination of $SiO_2$, $B_2O_3$ and $CdCO_3$). The types and combination of these compounds are selected appropriately depending upon the characteristics, etc. of desired multi-component glass doped with microparticles.

In the present process for producing a multi-component glass doped with microparticles, the material to become a matrix of a multi-component glass has the above restriction. The reason is as follows.

When the microparticles to be precipitated in the matrix are heated in an oxygen atmosphere, there occurs weight decrease at absolute temperatures higher than 0.5 time the melting point (expressed in absolute temperature) of the microparticles. This weight decrease occurs because the chalcogen element(s) constituting the microparticles is (are) oxidized to form low-boiling chalcogen oxide(s) and the chalcogen oxide(s) is (are) vaporized. Accordingly, when an oxidizing atmosphere is used as a melting atmosphere for obtaining a glass melt, or when a neutral atmosphere is used but there are used, as the material to become a matrix of a multi-component glass, nitrates (e.g. $NaNO_3$, $KNO_3$), chlorides (e.g. NaCl, KCl), and carbonates or hydroxides each to become an oxide by thermal decomposition at absolute temperatures higher than 0.5 time the melting point (expressed in absolute temperature) of the microparticles to be precipitated in the matrix, the chalcogen element(s) constituting the microparticles is (are) oxidized and vaporized. Meanwhile, when there are used, as the material to become a matrix of a multi-component glass, at least one member selected from the group consisting of oxides (e.g. $SiO_2$, $B_2O_3$, ZnO) usable as raw materials for ordinary glasses, carbonates each to become an oxide by thermal decomposition at absolute temperatures not higher than 0.5 time the melting point (expressed in absolute temperature) of the microparticles to be precipitated in the matrix, hydroxides each to become an oxide by thermal decomposition at absolute temperatures not higher than 0.5 time the melting point (expressed in absolute temperature) of the microparticles to be precipitated in the matrix, and a glass, the oxidation of the chalcogen element(s) constituting the microparticles to be precipitated in the matrix can be prevented and, as a result, there can be suppressed the vaporization of chalcogen element(s) from the material to become microparticles precipitated in the matrix.

Preferably, the amount of water and sulfur oxide(s) present as impurities or adsorbed substances in the material to become a matrix of a multi-component glass, is 1% by weight or less based on the total weight of the material in order to suppress the vaporization of chalcogen element(s) at the step for obtaining a glass melt.

In the present process for producing a multi-component glass doped with microparticles, it is preferable to use, as the material to become microparticles precipitated in the matrix, substance(s) comprising the elements to constitute the microparticles, for example, simple substances (e.g. Cd, S, Se, Te), compounds (e.g. CdS, CdSe, CdTe, their solid solutions) or a mixture of said simple substance(s) and said compound(s). The types and combination of these materials are selected appropriately depending upon the characteristics, etc. of desired multi-component glass doped with microparticles.

The material to become microparticles precipitated in the matrix preferably has a purity of 99% or more because the use of a material containing a large amount of oxide impurities or hydroxide impurities gives a high vaporization loss of chalcogen element(s) at the step for obtaining a glass melt.

In the present process for producing a multi-component glass doped with microparticles, a mixture of a material to become a matrix of a multi-component glass and a material to become microparticles precipitated in the matrix, i.e. a substance comprising the elements to constitute the microparticles is heated in a mixed gas atmosphere consisting of an inert gas and a vapor of a substance comprising at least one of the same chalcogen elements as constituting the microparticles to be precipitated in the matrix, to obtain a glass melt having an obsolute temperature of 0.8-1.2 times the melting point (expressed in absolute temperature) of the microparticles to be precipitated in the matrix.

The above mixed gas atmosphere used for obtaining a glass melt (i.e. the atmosphere for melting) can be prepared by placing, for example, a substance of the same composition as the microparticles to be precipitated in the matrix, a mixture comprising the same elements as constituting the microparticles to be precipitated in the matrix, or the same chalcogen element(s) as constituting the microparticles to be precipitated in the matrix, in a refractory container (e.g. a $SiO_2$-made crucible), placing the refractory container in an atmosphere vessel for obtaining a glass melt, replacing the atmosphere in the vessel with an inert gas such as $N_2$, Ar, He or the like, and heating the atmosphere vessel to generate a vapor comprising chalcogen element(s). By using such a melting atmosphere in obtaining a glass melt, the vaporization of chalcogen element(s) from the material to become microparticles precipitated in the matrix can be suppressed.

The substance comprising at least one of the same chalcogen elements as constituting the microparticles to be precipitated in the matrix may or may not have the same composition as the microparticles to be precipitated in the matrix, as long as the vaporization of chalcogen element(s) from the material to become microparticles to be precipitated in the matrix can be suppressed. This is because the vaporizability of chalcogen element differs by the kind of chalcogen element. Therefore, when the microparticles to be precipitated in the matrix comprise two or three chalcogen elements as the constituent elements (for example, when the microparticles consist of CdSSe), the kind of the chalcogen elements to be present in the above substance can be one or two both of high vaporizability (accordingly, the substance is, for example, CdSe).

The use of a strongly reducing atmosphere (e.g. H) as the melting atmosphere in obtaining a glass melt, is not proper because it generates low-boiling substances such as chalcogen hydride(s) or helps the vaporization of chalcogen element(s).

As mentioned above, the temperature (expressed in absolute temperature) of the glass melt obtained, is 0.8-1.2 times the melting point (expressed in absolute temperature) of the microparticles to be precipitated in the matrix. The reason is as follows. When the temperature is lower than 0.8 time, it is impossible to ionize the elements constituting the material to become microparticles precipitated in the matrix and dissolve them in the matrix. When the temperature is higher than 1.2 times, the vaporization amount of the material to become microparticles precipitated in the matrix is large. When the absolute temperature of the glass melt obtained is 0.9-1.1 times the melting point (expressed in absolute temperature) of the microparticles to be precipitated in the matrix, the vaporization amount of the element(s) or compound(s) constituting the material to become microparticles precipitated in the matrix is small and such a temperature is particularly preferable.

In the present process for producing a multi-component glass doped with microparticles, the glass melt is then heat-treated at a temperature at which microparticles can be precipitated, or particularly preferably at a temeprature at which the viscosity of the glass melt becomes $10^4$-$10^{13}$ poise; alternatively, the glass melt is cooled to room temperature to obtain a glass and then the glass is heat-treated at a temperature at which microparticles can be precipitated, or particularly preferably at a temperature at which the viscosity of the glass becomes $10^4$-$10^{13}$ poise; whereby microparticles of $CdS_x Se_y Te_z$ having diameters of appropriately 1,000 Å or less can be precipitated.

In the present process for producing a multi-component glass doped with microparticles, the vaporization of chalcogen element(s) from the material to become microparticles precipitated in a matrix of a multi-component glass is suppressed, making it possible to obtain a glass melt containing a high concentration of the material to become microparticles precipitated in the matrix; accordingly, a multi-component glass containing a high concentration (5-50% by weight) of microparticles can be obtained by appropriately selecting the amount of material to become microparticles, the conditions used for obtaining a glass melt, the heat treatment conditions used for precipitating microparticles, etc.

The present invention is described in more detail below by way of Examples.

EXAMPLE 1

There were mixed, as a material to become a glass matrix (composition: 45% by weight of $B_2O_3$ and 55% by weight of ZnO), 40.5 parts by weight of $B_2O_3$ and 49.5 parts by weight of ZnO and, as a material to become microparticles (CdSe) precipitated in the matrix, 10 parts by weight of CdSe [melting point: 1,533k (1,260° C.)] to obtain a mixture (in this mixture, the proportion of the material to become microparticles was 10% by weight). The mixture was made into a glass melt, using an atmosphere controlled melting equipment schematically shown in FIG. 1.

The atmosphere controlled melting equipment 1 has an atmosphere vessel 4 equipped with a gas-intaking tube 2 and a gas-discharging tube 3. Inside the atmosphere vessel 4 is provided a refractory crucible 6 (made of $SiO_2$ in this Example) accomodating the above-mentioned mixture 5. Into the refractory crucible 6 is inserted a stirrer 7. The bottom of the refractory crucible 6 communicates with a drain 8. At the circumference of the drain 8 is provided an electric furnace 9 for heating the drain 8. Inside the atmosphere vessel 4 is provided, besides the refractory crucible 6 for accomodating the mixture 5, refractory container 11 (made of $SiO_2$ in this Example) for accomodating CdSe 10 which has the same composition as CdSe microparticles to be precipitated in a glass matrix. An electric furnace 12 for heating the atmosphere vessel 4 is provided at the side and bottom of the atmosphere vessel 4.

The production of a glass melt by the atmosphere controlled melting equipment 1 was conducted as follows.

There were placed in the atmosphere vessel 4 the refractory crucible 6 containing the above-mentioned $B_2O_3$-ZnO-CdSe mixture 5 and the refractory container 11 containing 5 parts by weight of CdSe 10. The atmosphere in the atmosphere vessel 4 was replaced with a $N_2$ gas atmosphere. Then, while the contents in the refractory crucible 6 were stirred with the stirrer 7, the atmosphere vessel 4 was heated for 1 hour by the electric furnace 12 so that the temperature of the resulting glass melt became 1,473K [1,200° C., 0.96 time the melting point (expressed in absolute temperature) of CdSe], to melt the above mixture 5 to obtain a glass melt.

Next, the glass melt was casted on an aluminum plate to cool it and then annealed to room temperature to obtain a glass containing a component to become CdSe microparticles.

Incidentally, the CdSe 10 in the refractory container 11 was weighed after the glass melt had been obtained, whereby weight decrease of CdSe 10 by 30% by weight was confirmed. This indicates that the atmosphere used for obtaining a glass melt was a mixed gas atmosphere consisting of $N_2$ gas and gaseous CdSe or Se. Further, the concentrations of Cd and Se in the above-mentioned glass containing a component to become CdSe microparticles were measured by chemical analysis, and the total content of Cd and Se was 9.8% by weight and was about the same level as in the material (CdSe) used. This indicates that the vaporization of chalcogen element (Se) from the material (CdSe) to become microparticles was suppressed at the step for obtaining a glass melt.

Thereafter, the glass containing a component to become CdSe microparticles was heat-treated at 600° C. for 2 hours to precipitate CdSe microparticles. The resulting glass was annealed to room temperature to obtain a multi-component glass doped with CdSe microparticles.

The multi-component glass doped with CdSe microparticles was measured for size of CdSe microparticles by X-ray diffractometry. The average diameter of CdSe microparticles was 50 Å.

Figure 2:
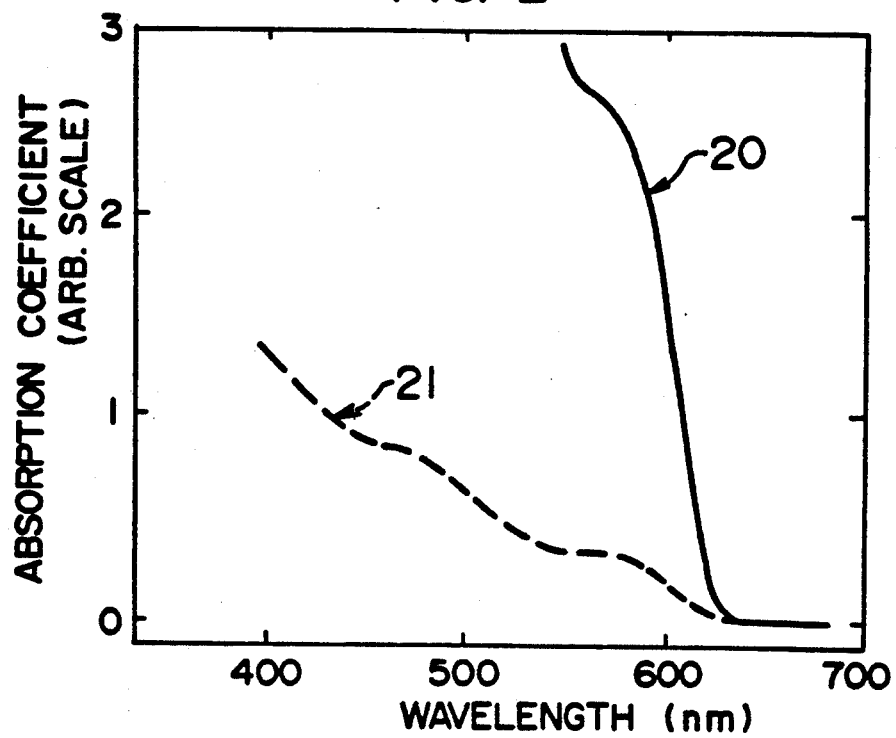
FIG. 2 is a graph showing the light absorption curves of the multi-component glasses doped with microcrystallites of CdSe, produced in Example 1 and Comparative Example 1.

Further, the multi-component glass doped with CdSe microparticles was subjected to optical polishing to a thickness of 0.1 mm and measured for light absorption spectrum. As a result, the light absorption curve gave sharp rise as shown in the solid line 20 of FIG. 2 and the glass was found to have an excellent spectral characteristic as a material for thin filter. Furthermore, the concentration of CdSe microparticles was determined from the light absorption characteristic. As a result, the concentration was as high as about 9% by weight as shown in Table 1 and the multi-component glass doped with microparticles would have a large optical susceptibility ($\chi^{(3)}$).

COMPARATIVE EXAMPLE 1

A glass containing a component to become CdSe microparticles was obtained in the same manner as in Example 1 except that there were used, as a material to become a glass matrix (composition: 45% by weight of $B_2O_3$ and 55% by weight of ZnO), 40.5 parts by weight of $B_2O_3$ and 115 parts by weight of nitrate $Zn(NO_3)_2$ whose use as said material is not allowed in the present invention.

The glass containing a component to become CdSe microparticles was measured for Se concentration in the same manner as in Example 1. The Se concentration was 0.4% by weight, which was about 10% of the amount which had been present in the material (CdSe). This clearly indicates that about 90% of the chalcogen element which had been present in the material (CdSe) was lost by vaporization at the step for obtaining a glass melt.

Then, the glass containing a component to become CdSe microparticles was heat-treated in the same manner as in Example 1 to obtain a multi-component glass doped with CdSe microparticles.

The multi-component glas doped with CdSe microparticles was measured for light absorption characteristic in the same manner as in Example 1. As shown in the broken line 21 of FIG. 2, the glass gave mild (not sharp) rise in the light absorption curve, as compared with the multi-component glass doped with CdSe microparticles obtained in Example 1. The glass was also determined for the concentration of CdSe microparticles, using the above light absorption characteristic. The concentration was about 1% by weight as shown in Table 1, which was about 1/9 of the CdSe microparticles concentration in the multi-component glass doped with CdSe microparticles obtained in Example 1.

COMPARATIVE EXAMPLE 2

A glass melt was obtained in the same manner as in Example 1 except that heating and melting was effected without placing the refractory container 11 containing CdSe 10, in the atmosphere vessel 4.

Then, a glass containing a component to become CdSe microparticles was obtained in the same manner as in Example 1. The glass was measured for Se concentration in the same manner as in Example 1. The Se concentration was 0.2% by weight, which was about 5% of the amount which had been present in the material (CdSe). This indicates that about 95% by weight of the chalcogen element which had been present in the material (CdSe) was lost by vaporization at the step for obtaining a glass melt.

Next, the glass containing a component to become CdSe microparticles was heat-treated in the same manner as in Example 1. However, no microparticles were observed. The concentration of CdSe microparticles in the heat-treated glass was determined using the light absorption characteristic and was found to be 0% by weight as shown in Table 1.

EXAMPLES 2-10

The multi-component glasses doped with microparticles, of Examples 2-10 were obtained in the same manner as in Example 1 except that there were set as follows (a) the material for microparticles to be precipitated and its amount, (b) the proportion of the material for microparticles to be precipitated to the total amount of the material for multi-component glass matrix and the material for microparticles to be precipitated, (c) the temperature of glass melt and (d) the substance to be placed in the refractory container 11 and its amount.

EXAMPLE 2

(a) Cd: 6 parts by weight, Se: 4 parts by weight
(b) 10% by weight
(c) 1,373K (1,100° C.; 0.90 time the melting point of CdSe expressed in absolute temperature)
(d) CdSe: 5 parts by weight

EXAMPLE 3

(a) CdSe: 20 parts by weight (b) 20% by weight
(c) 1,473K (1,200° C.; 0.96 time the melting point of CdSe expressed in absolute temperature)
(d) CdSe: 8 parts by weight

EXAMPLE 4

(a) CdSe: 40 parts by weight
(b) 40% by weight
(c) 1,473K (1,200° C.; 0.96 time the melting point of CdSe expressed in absolute temperature)
(d) CdSe: 20 parts by weight

EXAMPLE 5

(a) CdS [melting point: 2,023K (1,750° C.)]: 10 parts by weight
(b) 10% by weight
(c) 1.623K (1,350° C.; 0.80 time the melting point of CdS expressed in absolute temperature)
(d) CdS: 5 parts by weight

EXAMPLE 6

(a) CdTe [melting point: 1,341K (1,041° C.)]: 10 parts by weight
(b) 10% by weight
(c) 1,373K (1,100° C.; 1.02 times the melting point of CdTe expressed in absolute temperature)
(d) CdTe: 15 parts by weight

EXAMPLE 7

(a) CdTe: 10 parts by weight
(b) 10% by weight
(c) 1,473K (1,200° C.; 1.10 times the melting point of CdTe expressed in absolute temperature)
(d) CdTe: 15 parts by weight

EXAMPLE 8

(a) CdTe: 10 parts by weight
(b) 10% by weight
(c) 1,573K (1,300° C.; 1.17 times the melting point of CdTe expressed in absolute temperature)
(d) CdTe: 15 parts by weight

EXAMPLE 9

(a) CdS: 2 parts by weight, CdSe: 8 parts by weight
(b) 10% by weight
(c) 1,773K {1,500° C.; 1.09 times the melting point (expressed in absolute temperature) of $CdS_{0.2}Se_{0.8}$ [melting point: 1,631K (1,358° C.)]}
(d) CdSe: 5 parts by weight

EXAMPLE 10

(a) CdS: 1 part by weight, CdSe: 8 parts by weight, CdTe: 1 part by weight
(b) 10% by weight
(c) 1,373K {1,100° C.; 0.88 time the melting point (expressed in absolute temperature) of $CdS_{0.1}Se_{0.8}Te_{0.1}$ [melting point: 1,560K (1,287° C.)]}
(d) CdS: 0.3 part by weight, CdSe: 2.4 parts by weight, CdTe: 0.4 part by weight The thus obtained multi-component glasses doped with microparticles, of Examples 2-10 were measured for light absorption characteristic in the same manner as in Example 1. Each of these glasses, similarly to the multi-component glass doped with CdSe microparticles obtained in Example 1, gave sharp rise in the light absorption curve and had an excellent spectral characteristic as a material for thin filter. Further, the above glasses were determined for concentration of microcrystallites using the light absorption characteristics. As shown in Table 1, the concentration of microparticles was high, i.e. about 9% by weight (Example 2), about 17% by weight (Example 3), about 38% by weight (Example 4), about 10% by weight (Example 5), about 8% by weight (Example 6), about 9% by weight (Example 7), about 5% by weight (Example 8), about 10% by weight (Example 9) and about 9% by weight (Example 10). Accordingly, the glasses each would have a large optical susceptibility ($\chi^{(3)}$).

COMPARATIVE EXAMPLE 3

A multi-component glass doped with CdSe microparticles was obtained in the same manner as in Example 3 except that 60 parts by weight (60% by weight) of CdSe was used as the material for microparticles to be precipitated. In the glass, the concentration of microparticles was 60% by weight, which was outside the range specified by the present invention.

A white light was applied to the multi-component glass doped with CdSe microparticles to visually observe the degree of light scattering. A high degree of light scattering was observed. The glass was also measured for light absorption characteristic in the same manner as in Example 3. The light transmittance was low (about 10%).

Thus, the multi-component glass doped with microparticles gave a high degree of light scattering and could not be used as an optical material such as material for filter, nonlinear optical material or the like.

COMPARATIVE EXAMPLE 4

A glass was obtained in the same manner as in Example 6 except that the temperature of glass melt was 1,723K (1,450° C.; 1.31 times the melting point of CdTe expressed in absolute temperature) which was outside the range specified by the present invention.

The Te concentration in the glass was determined in the same manner as in Example 6 but could not be detected (detection limit: 0.05% by weight).

The glass was heat-treated in order to precipitate microparticles, but no precipitation of CdTe microparticles was seen.

EXAMPLE 11

A multi-component glass doped with CdSe microparticles was obtained in the same manner as in Example 1 except that there were used, as the material to become a matrix of a multi-component glass, 72 parts by weight of $H_3BO_3$ [thermal decomposition temperature: 573K (300° C.); 0.37 time the melting point of CdSe expressed in absolute temperature] and 49.5 parts by weight of ZnO.

The glass was measured for light absorption characteristic in the same manner as in Example 1. The glass, similarly to the multi-component glass doped with CdSe microparticles obtained in Example 1, gave sharp rise in the light absorption curve and had an excellent spectral characteristic as a material for thin filter. The glass was also determined for concentration of CdSe microparticles, using the light absorption characteristic. The concentration was high (about 10% by weight) as shown in Table 1, and the multi-component glass doped with microparticles would have a large optical susceptibility ($\chi^{(3)}$).

EXAMPLE 12

A multi-component glass doped with CdSe microparticles was obtained in the same manner as in Example 1 except that there were used, as the material to become a matrix of a multi-component glass, 72 parts by weight of $H_3BO_3$ [thermal decomposition temperature: 573K (300° C.); 0.37 time the melting point of CdSe expressed in absolute temperature] and 67 parts by weight of $CdCO_3$ [thermal decomposition temperature: 630K (357° C.); 0.41 time the melting point of CdSe expressed in absolute temperature].

The glass was measured for light absorption characteristic in the same manner as in Example 1. The glass, similarly to the multi-component glass doped with CdSe microparticles obtained in Example 1, gave sharp rise in the light absorption curve and had an excellent spectral characteristic as a material for thin filter. The glass was also determined for concentration of CdSe microparticles, using the light absorption characteristic. The concentration was high (about 8% by weight) as shown in Table 1, and the multi-component glass doped with microparticles would have a large optical susceptibility ($\chi^{(3)}$).

EXAMPLE 13

A multi-component glass doped with CdSe microparticles was obtained in the same manner as in Example 1 except that there was used, as the material to become a matrix of a multi-component glass, 90 parts by weight of a glass powder having a composition of 45% by weight of $B_2O_3$ and 55% by weight of ZnO.

The glass was measured for light absorption characteristic in the same manner as in Example 1. The glass, similarly to the multi-component glass doped with CdSe microparticles obtained in Example 1, gave sharp rise in the light absorption curve and had an excellent spectral characteristic as a material for thin filter. The glass was also determined for concentration of CdSe microparticles, using the light absorption characteristic. The concentration was high (about 10% by weight) as shown in Table 1, and the multi-component glass doped with microparticles would have a large optical susceptibility ($\chi^{(3)}$).

EXAMPLE 14

A multi-component glass doped with CdSe microparticles was obtained in the same manner as in Example 1 except that He was used as an inert gas.

The glass was measured for light absorption characteristic in the same manner as in Example 1. The glass, similarly to the multi-component glass doped with CdSe microparticles obtained in Example 1, gave sharp rise in the light absorption curve and had an excellent spectral characteristic as a material for thin filter. The glass was also determined for concentration of CdSe microparticles, using the light absorption characteristic. The concentration was high (about 10% by weight) as shown in Table 1, and the multi-component glass doped with microparticles would have a large optical susceptibility ($\chi^{(3)}$).

EXAMPLE 15

A glass containing a component to become CdSe microparticles was obtained in the same manner as in Example 1 except that there was used, as a material for a glass matrix composed mainly of $SiO_2$, $K_2O$ and ZnO, 90 parts by weight of a glass powder having the same composition as the glass matrix, Ar gas was used as an inert gas at the step for obtaining a glass melt, the temperature of glass melt was 1,573K (1,300° C.; 1.03 times the melting point of CdSe expressed in absolute temperature), and the heating time was 2 hours.

The glass was measured for Cd and Se concentrations by chemical analysis. The total concentration of Cd and Se was 8.3% by weight.

Thereafter, the glass containing a component to become CdSe microparticles was heat-treated at 720° C. for 2 hours to precipitate CdSe microparticles. The resulting glass was annealed to room temperature to obtain a multi-component glass doped with CdSe microparticles.

The multi-component glass doped with CdSe microparticles was measured for size of CdSe microparticles by X-ray diffractometry. The average diameter of CdSe microparticles was 60 Å.

Figure 3:
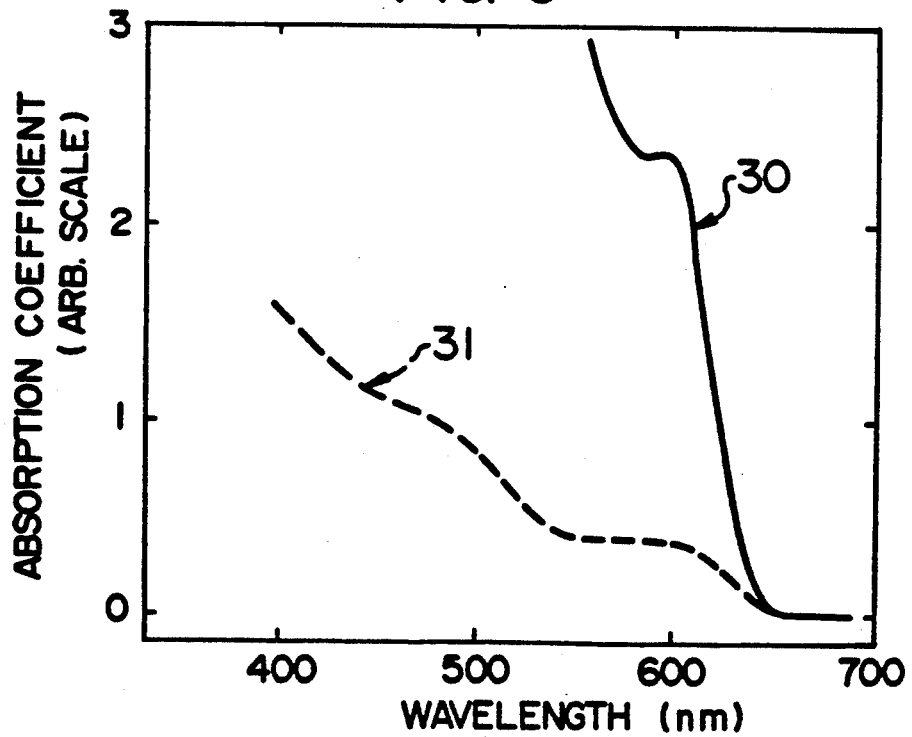
FIG. 3 is a graph showing the light absorption curves of the multi-component glasses doped with microparticles of CdSe, produced in Example 15 and Comparative Example 4.

The multi-component glass doped with CdSe microparticles was also measured for light absorption characteristic in the same manner as in Example 1. As a result, the light absorption curve gave sharp rise as shown in the solid line 30 of FIG. 3 and the glass was found to have an excellent spectral characteristic as a material for thin filter. Further, the concentration of CdSe microparticles was determined from the light absorption characteristic. As a result, the concentration was as high as about 8% by weight as shown in Table 1 and the multi-component glass doped with microparticles would have a large optical susceptibility ($\chi^{(3)}$).

EXAMPLE 16

A multi-component glass doped with CdSe microparticles was obtained in the same manner as in Example 15 except that there were used, as a material to become a matrix of a multi-component glass, 80 parts by weight of the same glass powder as used in Example 15, 2 parts by weight of $B_2O_3$ and 8 parts by weight of ZnO.

The glass was measured for light absorption characteristic in the same manner as in Example 15. The glass, similarly to the multi-component glass doped with CdSe microparticles obtained in Example 15, gave sharp rise in the light absorption curve and had an excellent spectral characteristic as a material for thin filter. The glass was also determined for concentration of CdSe microparticles, using the light absorption characteristic. The concentration was high (about 10% by weight) as shown in Table 1, and the multi-component glass doped with microparticles would have a large optical susceptibility ($\chi^{(3)}$).

COMPARATIVE EXAMPLE 5

A glass containing a component to become CdSe microparticles was obtained in the same manner as in Example 15 except that there were used, as a material to become a matrix of a multi-component glass, 80 parts by weight of the same glass powder as used in Example 15 and 15 parts by weight of $K_2CO_3$ [thermal decomposition temperature: 1,163K (890° C.); 0.76 time the melting point of CdSe expressed in absolute temperature] which is not specified by the present invention.

The glass containing a component to become CdSe microparticles was measured for Se concentration. The Se concentration was 0.6% by weight, which was about 15% of the amount which had been present in the material (CdSe). This clearly indicates that about 85% of the chalcogen element which had been present in the material (CdSe) was lost by vaporization at the step for obtaining a glass melt.

ticles concentration in the multi-component glass doped with CdSe microparticles obtained in Example 15.

TABLE 1

| | Material*[1] for glass matrix | Material for microparticles precipitated in matrix | Temperature (K)*[2] of glass melt | Atmosphere for melting Substance*[3] | Inert gas | Concentration (wt %)*[4] of microparticles, calculated from material | Concentration (wt %) of microparticles in multi-component glass doped with microparticles |
|---|---|---|---|---|---|---|---|
| Example 1 | Oxides ($B_2O_3$, ZnO) | CdSe | [Melting point (K) of CdSe] × 0.96 | CdSe | $N_2$ gas | 10 | 9 |
| Example 2 | " | Cd, Se | [Melting point (K) of CdSe] × 0.90 | " | " | 10 | 9 |
| Example 3 | " | CdSe | [Melting point (K) of CdSe] × 0.96 | " | " | 20 | 17 |
| Example 4 | " | " | [Melting point (K) of CdSe] × 0.96 | " | " | 40 | 38 |
| Example 5 | " | CdS | [Melting point (K) of CdS] × 0.80 | CdS | " | 10 | 10 |
| Example 6 | " | CdTe | [Melting point (K) of CdTe] × 1.02 | CdTe | " | 10 | 8 |
| Example 7 | " | " | [Melting point (K) of CdTe] × 1.10 | " | " | 10 | 9 |
| Example 8 | " | " | [Melting point (K) of CdTe] × 1.17 | " | " | 10 | 5 |
| Example 9 | " | CdS, CdSe | [Melting point (K) of CdSSe] × 1.09 | CdSe | " | 10 | 10 |
| Example 10 | " | CdS, CdSe, CdTe | [Melting point (K) of CdSSeTe] × 0.88 | CdS, CdSe, CdTe | " | 10 | 9 |
| Example 11 | Hydroxide ($H_3BO_3$ [0.37]), oxide(ZnO) | CdSe | [Melting point (K) of CdSe] × 0.96 | CdSe | " | 10 | 10 |
| Example 12 | Hydroxide ($H_3BO_3$ [0.37]), carbonate ($CdCO_3$ [0.41]) | " | [Melting point (K) of CdSe] × 0.96 | " | " | 10 | 8 |
| Example 13 | $B_2O_3$—ZnO glass powder | CdSe | [Melting point (K) of CdSe] × 0.96 | CdSe | $N_2$ gas | 10 | 10 |
| Example 14 | Oxides $B_2O_3$, ZnO | " | [Melting point (K) of CdSe] × 0.96 | " | He gas | 10 | 10 |
| Example 15 | Glass powder composed mainly of $SiO_2$, $K_2O$ and ZnO | " | [Melting point (K) of CdSe] × 1.03 | " | Ar gas | 10 | 8 |
| Example 16 | Glass powder composed mainly of $SiO_2$, $K_2O$ and ZnO, oxides ($B_2O_3$, ZnO) | " | [Melting point (K) of CdSe] × 1.03 | " | " | 10 | 10 |
| Comparative Example 1 | Oxide ($B_2O_3$), nitrate ($Zn(NO_3)_2$) | CdSe | [Melting point (K) of CdSe] × 0.96 | CdSe | $N_2$ gas | 10 | 1 |
| Comparative Example 2 | Oxides ($B_2O_3$, ZnO) | " | [Melting point (K) of CdSe] × 0.96 | " | " | 10 | 0 |
| Comparative Example 3 | " | " | [Melting point (K) of CdSe] × 0.96 | CdSe | " | 60 | 60 (Light scattering is seen) |
| Comparative Example 4 | " | CdTe | [Melting point (K) of CdTe] × 1.31 | CdTe | " | 10 | 0 |
| Comparative Example 5 | Same glass powder as in Example 15, carbonate ($K_2CO_3$ [0.76]) | CdSe | [Melting point (K) of CdSe] × 1.03 | CdSe | Ar gas | 10 | 0.6 |

*[1]The value in [ ] indicates a ratio of the thermal decomposition temperature (expressed in absolute temperature) of material to the melting point (expressed in absolute temperature) of microparticles to be precipitated.
*[2]The absolute temperature (K) of glass melt is indicated in the form of "melting point (expressed in absolute temperature) of microparticles to be precipitated × coefficient".
*[3]Refers to a substance comprising at least one of the chalcogen elements constituting the microparticles to be precipitated, which substance was used for vaporization to obtain a vapor.
*[4]Indicates a concentration of microparticles in multi-component glass doped with microparticles, calculated from the material of the microparticles.

Then, the glass containing a component to become CdSe microparticles was heat-treated in the same manner as in Example 15 to obtain a multi-component glass doped with CdSe microparticles.

The multi-component glas doped with CdSe microparticles was measured for light absorption characteristic in the same manner as in Example 15. As shown in the broken line 31 of FIG. 3, the glass gave mild (not sharp) rise in the light absorption curve, as compared with the multi-component glass doped with CdSe microparticles obtained in Example 15. The glass was also determined for the concentration of CdSe microparticles, using the above light absorption characteristic. The concentration was about 0.6% by weight as shown in Table 1, which was about 1/13 of the CdSe micropar- As described above, the multi-component glass doped with microparticles according to the present invention contains microparticles at a high concentration of 5-50% by weight. This multi-component glass containing microparticles at a high concnetration of 5-50% by weight can be obtained by the present process for producing a multi-component glass doped with microparticles wherein the vaporization of chalcogen element(s) is suppressed at the step for obtaining a glass melt.

Thus, according to the present invention there has been provided a multi-component glass doped with microparticles which shows an excellent spectral characteristic as a material for sharp cut filter or a material for infrared-transmitting filter even when made into a thin filter and which would further show a good nonlinearity as a nonlinear optical material.

What is claimed is:

1. A process for producing a multi-component oxide glass composition doped with microparticles, comprising:

(1) heating, to produce a glass melt, a mixture of:

(a) a material to become a glass matrix of a multi-component oxide glass, consisting essentially of at least one member selected from the group consisting of oxides usable as raw materials for ordinary glasses, carbonates each to become an oxide by thermal decomposition at absolute temperatures not higher than 0.5 times the melting point, expressed in absolute temperature, of the microparticles precipitated in the matrix, hydroxides each to become an oxide by thermal decomposition at absolute temperatures not higher than 0.5 times the melting point, expressed in absolute temperature of the microparticles precipitated in the glass matrix, and a glass and (b) a mixture comprising elemental Cd and at least one element selected from the group consisting of S, Se and Te to form the microparticles precipitated in the glass matrix, said heating conducted in a mixed gas atmosphere consisting of an inert gas and a vapor of a substance comprising said element to obtain a glass melt having an absolute temperature of 0.8–1.2 times the melting point, expressed in absolute temperature, of the microparticles to be precipitated in the matrix, and (2) heat-treating the glass melt at a given temperature, or cooling the glass melt and then heat treating the resulting glass at a given temperature, to precipitate, in the glass matrix, microparticles of $CdS_x Se_y Te_z$ ($0 \leq x \leq 1$, $0 \leq y \leq 1$, $0 \leq z \leq 1$, $x+y+z=1$) in an amount of 5–50% by weight of the resulting glass composition.

2. The process according to claim 1 wherein the matrix-forming material contains water, sulfur oxide or mixtures thereof as impurities or adsorbed substances in an amount of 1% by weight or less based on the total amount of the matrix-forming material.

3. The process according to claim 1 wherein the material forming the microparticles precipitated in the matrix is a mixture of elemental Cd and at least one element selected from the group consisting of S, Se and, Te or a solid solution, or a mixture of at least two compounds selected from the group consisting of CdS, CdSe and CdTe, or a mixture of two or more of the above substances, or a mixture of at least one of the above compounds and the above solid solution.

4. The process according to claim 1 wherein the material forming the microparticles has a purity of 99% or more.

5. The process according to claim 1 wherein the mixed gas atmosphere is obtained by placing in a refractory container at least one substance selected from the group consisting of a substance of the same composition as the microparticles to be precipitated in the matrix, a substance having the same constituent elements as the microparticles to be precipitated in the matrix and a substance having the chalcogen element or elements constituting the microparticles to be precipitated in the matrix, placing the refractory container in an atmosphere vessel and obtaining a glass melt, replacing the atmosphere in the vessel with an inert gas, and heating the atmosphere vessel.

6. The process according to claim 1 wherein the glass melt is heat-treated in step (2) at a temperature at which the viscosity of the glass melt becomes $10^4 - 10^{13}$ poise, to precipitate $CdS_x Se_y Te_z$ microparticles.

7. The process according to claim 1 wherein the glass melt is cooled to about 20° C. to obtain a glass and the glass is then heat-treated at a temperature at which the viscosity of the glass becomes $10^4 - 10^{13}$ poise, to precipitate $CdS_x Se_y Te_z$ microparticles.

* * * * *